(12) United States Patent
Nakano

(10) Patent No.: US 11,082,580 B2
(45) Date of Patent: Aug. 3, 2021

(54) MAGE PROCESSING DEVICE CONFIGURED TO DETERMINE SKEW, IMAGE PROCESSING METHOD FOR DETERMINING SKEW, AND STORAGE MEDIUM STORING IMAGE PROCESSING PROGRAM FOR DETERMINING SKEW

(71) Applicant: SEIKO EPSON CORPORATION, Tokyo (JP)

(72) Inventor: Yusuke Nakano, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/389,302

(22) Filed: Apr. 19, 2019

(65) Prior Publication Data

US 2019/0327385 A1    Oct. 24, 2019

(30) Foreign Application Priority Data

Apr. 23, 2018    (JP) .............................. JP2018-082663

(51) Int. Cl.
*H04N 1/387*    (2006.01)
*H04N 1/00*    (2006.01)

(52) U.S. Cl.
CPC ....... *H04N 1/3878* (2013.01); *H04N 1/00718* (2013.01); *H04N 1/00774* (2013.01)

(58) Field of Classification Search
CPC ............. H04N 1/3878; H04N 1/00178; H04N 1/00718; H04N 1/00726; H04N 1/00503; H04N 1/00774

See application file for complete search history.

(56) References Cited

U.S. PATENT DOCUMENTS

| | | | |
|---|---|---|---|
| 2006/0039629 A1* | 2/2006 | Li | H04N 1/00681 382/289 |
| 2008/0204778 A1* | 8/2008 | Koarai | H04N 1/0035 358/1.9 |
| 2008/0309989 A1* | 12/2008 | Shirai | B65H 7/06 358/474 |
| 2009/0323131 A1* | 12/2009 | Toyoda | G06T 3/608 358/448 |
| 2010/0020368 A1* | 1/2010 | Kawabuchi | H04N 1/00047 358/474 |
| 2010/0245870 A1* | 9/2010 | Shi Bata | G06K 9/033 358/1.9 |

(Continued)

FOREIGN PATENT DOCUMENTS

JP    2016-123043 A    7/2016

*Primary Examiner* — Nicholas Pachol
(74) *Attorney, Agent, or Firm* — Chip Law Group

(57) ABSTRACT

An image processing device includes a communication interface and a processor. The communication interface acquires a read image generated by reading an original document. The processor determines in accordance with an original document image, which corresponds to the original document in the read image, which one of a first skew causing tilt in the original document image and a second skew causing distortion in the original document image occurs. The processor changes in accordance with a result of the determination, processing to be executed when the skew occurs in the original document image. The second skew may include distortion of the original document image and tilt of the original document image.

9 Claims, 9 Drawing Sheets

(56) References Cited

U.S. PATENT DOCUMENTS

| | | | |
|---|---|---|---|
| 2013/0050767 A1* | 2/2013 | Stuart | H04N 1/00005 |
| | | | 358/3.26 |
| 2014/0233071 A1* | 8/2014 | Kido | H04N 1/00013 |
| | | | 358/3.26 |
| 2016/0028902 A1* | 1/2016 | Kasahara | H04N 1/00708 |
| | | | 358/498 |
| 2016/0037008 A1* | 2/2016 | Mori | H04N 1/00748 |
| | | | 358/518 |
| 2016/0261758 A1* | 9/2016 | Kimura | H04N 1/0032 |
| 2017/0104887 A1* | 4/2017 | Nomura | H04N 1/00355 |
| 2017/0142286 A1* | 5/2017 | Hirota | H04N 1/3873 |

* cited by examiner

IMAGE PROCESSING DEVICE CONFIGURED TO DETERMINE SKEW, IMAGE PROCESSING METHOD FOR DETERMINING SKEW, AND STORAGE MEDIUM STORING IMAGE PROCESSING PROGRAM FOR DETERMINING SKEW

The present application is based on, and claims priority from JP Application Serial Number 2018-082663, filed Apr. 23, 2018, the disclosure of which is hereby incorporated by reference herein in its entirety.

BACKGROUND

1. Technical Field

The present disclosure relates to an image processing device which processes an image generated by reading an original document, an image processing method, and a storage medium storing an image processing program.

2. Related Art

In an image generated by reading an original document by using a scanner, in some cases, image content in a region corresponding to an original document may be tilted. Techniques for correcting skew of such an image through image processing are known. As a related art, an image processing device, which corrects distortion of an image caused by change in tilt of the original document through transport, has been disclosed (refer to JP-A-2016-123043).

However, in an image resulting from reading performed by a scanner, plural types of skew, such as skew causing tilt or skew causing distortion, may occur. However, in the related art, it is difficult to appropriately deal with a skew in accordance with a type of the skew.

SUMMARY

According to an aspect of the present disclosure, an image processing device includes a communication interface and a processor. The communication interface acquires a read image generated by reading an original document. The processor determines in accordance with an original document image corresponding to the original document in the read image, which one of a first skew and a second skew occurs. The first skew causes tilt in an original document image. The second skew causes distortion in the original document image. The processor changes in accordance with a result of the determination, processing to be executed when the skew occurs in the original document image.

DESCRIPTION OF EXEMPLARY EMBODIMENTS

Hereinafter, embodiments of the present disclosure will be described with reference to the drawings. Each drawing is just an example for explaining the present embodiment. Accordingly, shapes, proportions, and the like may not be consistent with each other.

1. Schematic Description of System

Figure 1:
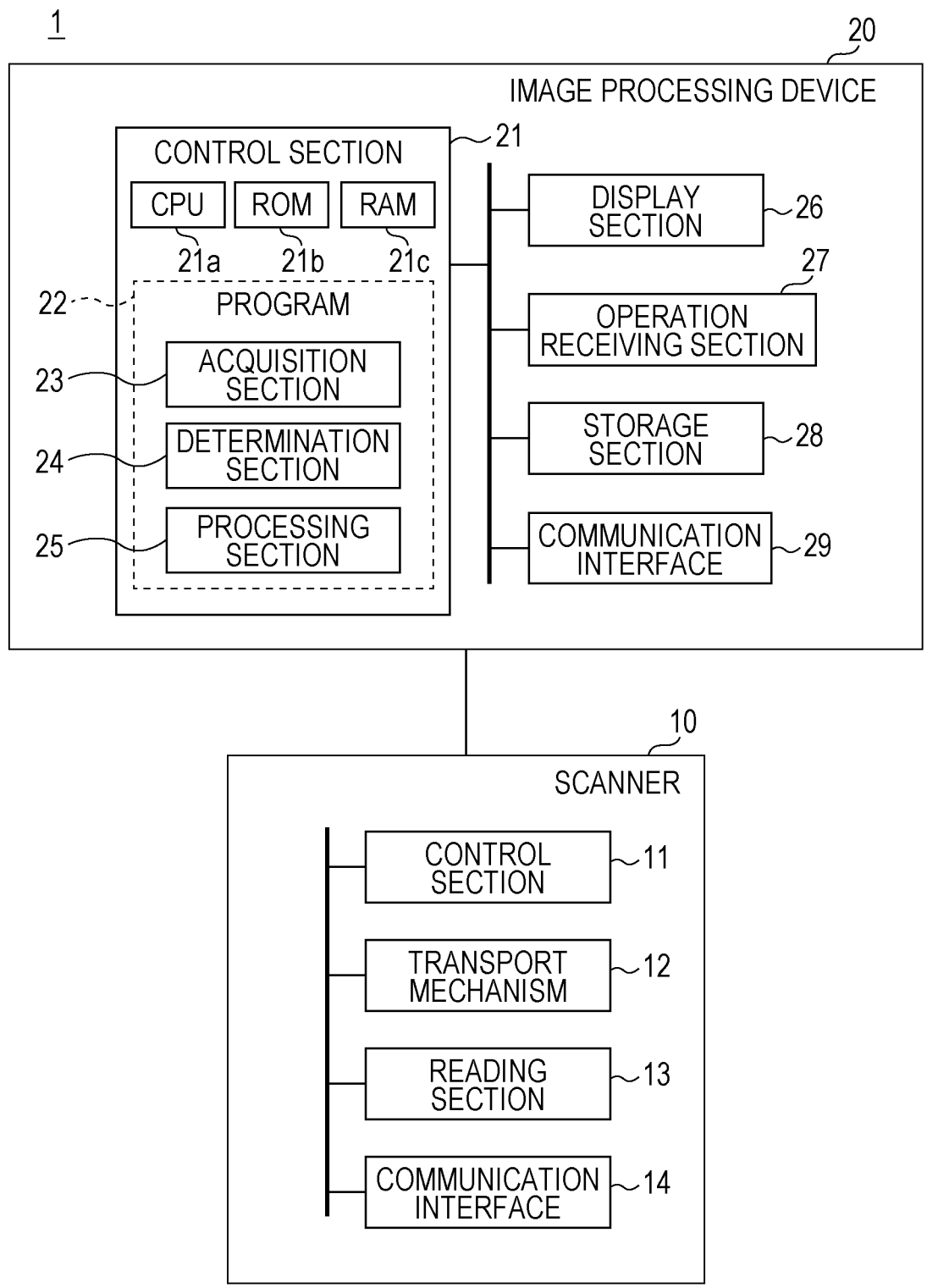
FIG. 1 is a diagram schematically illustrating a configuration of a system.

FIG. 1 schematically illustrates a configuration of a system 1 according to the present embodiment. The system 1 includes a scanner 10 and an image processing device 20. The system 1 may be referred to as an image reading system, an image processing system, or the like.

The image processing device 20 is implemented by using, for example, a personal computer (PC), a smartphone, a tablet-type terminal, a mobile phone, or an information processing apparatus having a processing capability equivalent to such devices. The image processing device 20 includes a control section 21, a display section 26, an operation receiving section 27, a storage section 28, a communication interface 29, and the like. The control section 21 is configured to include one or more ICs having a CPU 21$a$, a ROM 21$b$, a RAM 21$c$, and the like as processors, other memory, and the like.

In the control section 21, the processor (CPU 21$a$) controls the image processing device 20 by using the RAM 21$c$ and the like as a working area and by executing arithmetic processing through programs stored in the ROM 21$b$, the storage section 28, and the like. The control section 21 has a program 22 as one of the programs. By running the program 22, the control section 21 implements functions of an acquisition section 23, a determination section 24, a processing section 25, and the like. The program 22 corresponds to an image processing program run by the control section 21. It should be noted that the processor is not limited to one CPU and may be configured to perform processing via a plurality of CPUs or hardware circuits such as an ASIC, or may be configured to perform processing by using the CPU and the hardware circuit cooperatively.

The display section 26 displays visual information, and includes, for example, a liquid crystal display (LCD), an organic EL display, or the like. The display section 26 may include a display and a driving circuit for driving the display. The operation receiving section 27 receives an operation performed by a user, and is implemented by using, for example, a physical button, a touch panel, a mouse, a keyboard, and the like. The touch panel may be implemented as one function of the display section 26. The display section 26 and the operation receiving section 27 may be collectively referred to as an operation panel of the image processing device 20.

The storage section 28 is, for example, storage means constituted by a hard disk drive or a nonvolatile memory. The storage section 28 may be a part of the control section 21. The communication interface 29 is a generic name to denote one or more interfaces for enabling the image processing device 20 to communicate with the outside in a wired or wireless manner in accordance with a predetermined communication protocol including a known communication standard.

The scanner 10 includes a control section 11, a transport mechanism 12, a reading section 13, a communication interface 14, and the like. The transport mechanism 12 transports the original document to be read in a predetermined transport direction. The transport mechanism 12 includes, for example, a roller that transports an original document, a motor that generates power for rotating the roller, and a gear train and a belt that transmit the power from the motor to the roller. The reading section 13 includes, for example, a light source, an imaging device, and an optical system. The light source illuminates an original document transported by the transport mechanism 12. The imaging device receives light reflected from the original document and outputs an electrical signal as a reading result through photoelectric conversion. The optical system guides the light reflected from the original document onto the imaging device. The communication interface 14 is a generic name to denote one or more interfaces for enabling the scanner 10 to communicate with the outside in a wired or wireless manner in accordance with the predetermined communication protocol including a known communication standard.

Such a scanner 10 is a sheet-feed-type scanner in which the reading section 13 reads an original document while the original document is being transported by the transport mechanism 12. The control section 11 is configured to generate image data having a predetermined format based on the output from the imaging device of the reading section 13 and to output the image data. The scanner 10 and the image processing device 20 are connected to perform wired or wireless communication with each other through the communication interfaces 14 and 29. The scanner 10 and the image processing device 20 may be connected through a network.

The scanner 10 may be a multifunction peripheral having not only a scanner function, but also a plurality of functions such as a printing function and a facsimile communication function. Needless to say, the scanner 10 may have an operation panel including a display section and an operation receiving section.

In the example of FIG. 1, the scanner 10 and the image processing device 20 are independent from each other. However, as another embodiment, the scanner 10 and the image processing device 20 may be an integrated device. That is, the scanner 10 may include a configuration of the image processing device 20.

2. Processing for Dealing with Tilt According to Tilt Type

Figure 2:
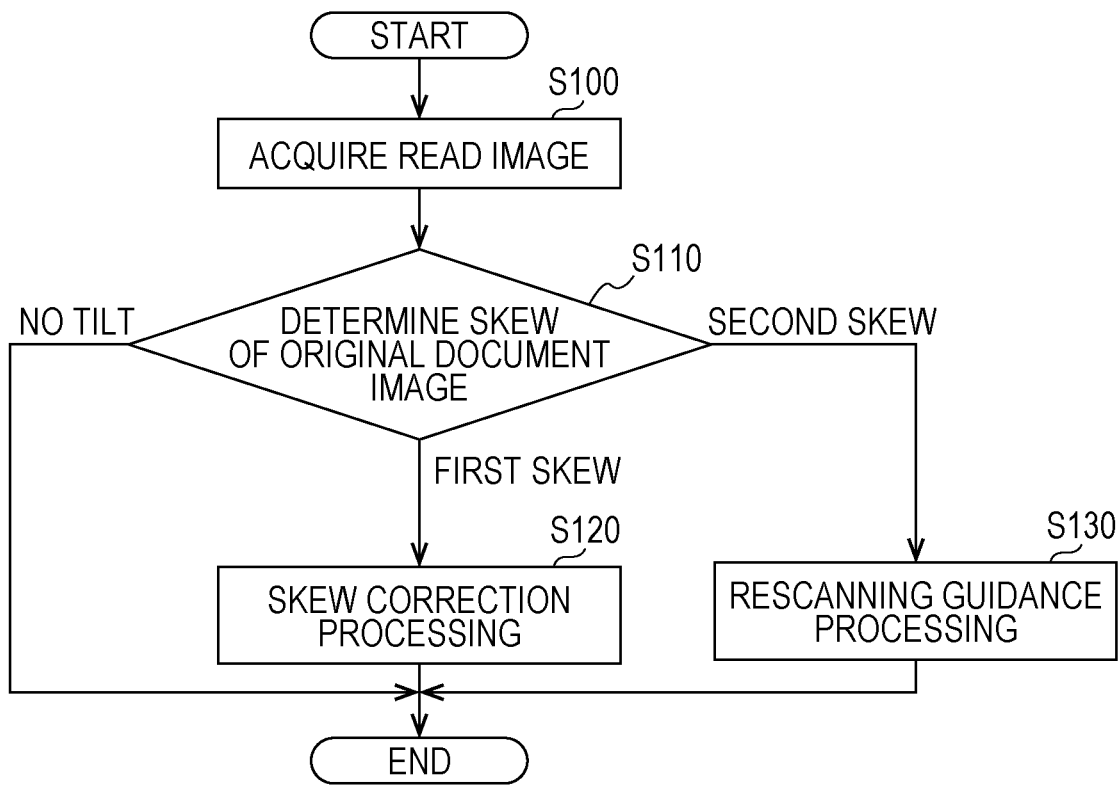
FIG. 2 is a flowchart illustrating processing according to the first embodiment.

FIG. 2 is a flowchart illustrating the processing executed by the control section 21 of the image processing device 20 in accordance with the program 22. This flowchart illustrates an image processing method.

In the system 1, first, in the scanner 10, an original document, which is arbitrarily placed by a user, is read by the reading mechanism 13 while being transported by the transport mechanism 12, and thereby image data is generated. Then, the scanner 10 transmits the generated image data (hereinafter referred to as a read image) to the image processing device 20 through the communication interface 14. The control section 21 of the image processing device 20 may command the scanner 10 to start scanning the original document through the communication interface 29, and the scanner 10 may start reading the original document in accordance with the command from the control section 21 to start reading the original document.

The control section 21 acquires the read image, which is transmitted from the scanner 10, through the communication interface 29 (step S100). It should be noted that the control section 21 may temporarily store the read image, which is received from the scanner 10, in the storage section 28 and may acquire the read image from the storage section 28 in step S100. Step S100 corresponds to an acquisition step of acquiring the read image generated by reading the original document. In terms of realizing step S100, the control section 21 that runs the program 22 functions as the acquisition section 23 that acquires the read image.

In step S110, the control section 21 determines the type of the skew of the region corresponding to the original document (hereinafter referred to as an original document image) in the read image acquired in step S100. When the control section 21 determines that the skew of the original document image corresponds to the first skew causing tilt, the processing proceeds to step S120. When the control section 21 determines that the skew of the original document image corresponds to the second skew causing distortion, the processing proceeds to step S130. Step S110 is a determination step of determining which one of the first skew causing the tilt in the original document image and the second skew causing the distortion in the original document image occurs in accordance with the original document image. In terms of realizing step S110, the control section 21, which runs the program 22, functions as the determination section 24 which determines the type of skew of the original document image.

The read image subjected to the determination in step S110 is constituted by two-dimensional (XY coordinate system) bitmap data. The control section 21 may appropriately perform format conversion on the read image at the time of transmission from the scanner 10 to acquire a read image as bitmap data.

Figure 3A:
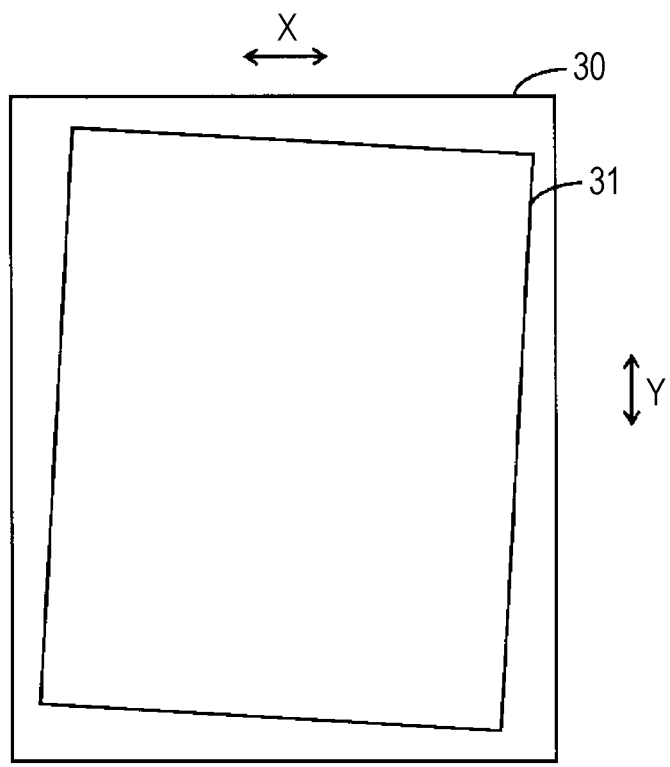
FIG. 3A is a diagram illustrating a case where a skew of an original document image corresponds to a first skew.
Figure 3B:
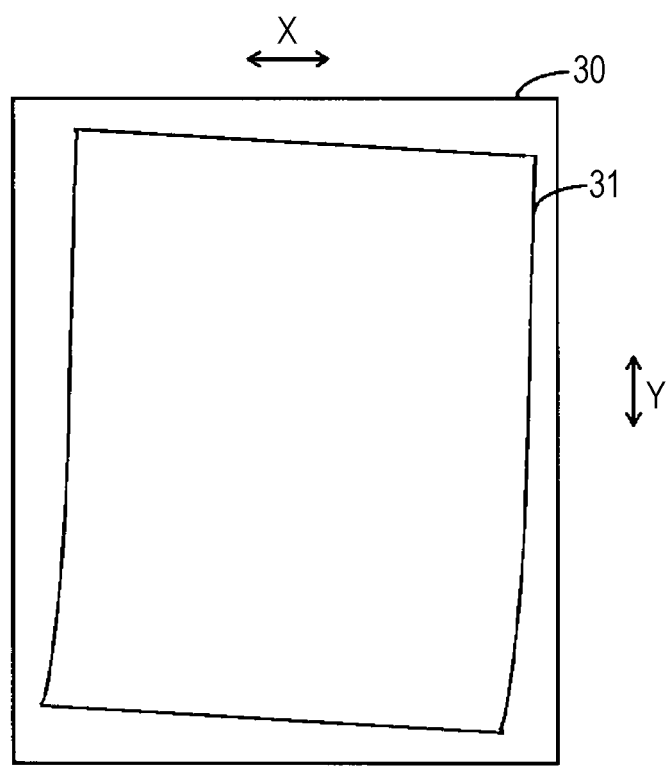
FIG. 3B is a diagram illustrating a case where a skew of an original document image corresponds to a second skew.

FIGS. 3A and 3B each illustrate a state where a skew occurs in an original document image 31 in the read image 30. In FIGS. 3A and 3B, the X direction indicates the horizontal direction of the read image 30 and the Y direction indicates the vertical direction of the read image 30. The X direction is orthogonal to the Y direction. The Y direction corresponds to a predetermined transport direction of the original document transported by the transport mechanism 12 of the scanner 10. Both of the original document images 31 illustrated in FIGS. 3A and 3B are tilted with respect to the Y direction.

The original document image 31 illustrated in FIG. 3A is obtained by reading an original document tilted with respect to the transport direction of the original document. When an original document being transported in tilted state is read, as illustrated in FIG. 3A, a first skew occurs in the original document image 31. In contrast, in the original document image 31 illustrated in FIG. 3B, a second skew which causes distortion in addition to a simple tilt, as illustrated in FIG. 3A, occurs. Here, distortion of the original document image denotes a state where the edges of the original document image which are originally straight become curved or folded. For example, due to inappropriate positioning and orientation of the original document placed on the scanner 10, an uneven force is applied to the original document from a transport roller which is provided in the transport mechanism 12 or from a member which supports the original document being transported. As a result, the tilt of the original document may change during transportation. In such a case, distortion of the original document image may occur due to reading of the original document being transported. When an original document such as a receipt with a width which is narrow relative to the paper guide is read, distortion of the original document image is likely to occur. As described above, the original document image 31 in the read image 30 may be in a state where a first skew causing tilt or a second skew causing tilt and distortion occurs.

In the present embodiment, tilt without distortion in the original document image 31 as illustrated in FIG. 3A is referred to as "first skew", and tilt with distortion in the original document image 31 as illustrated in FIG. 3B is referred to as "second skew". However, the expression "without distortion" includes not only a state where there is no distortion at all, but also a state where there is a low degree of distortion which is rarely detected in the determination in step S110.

Figure 4:
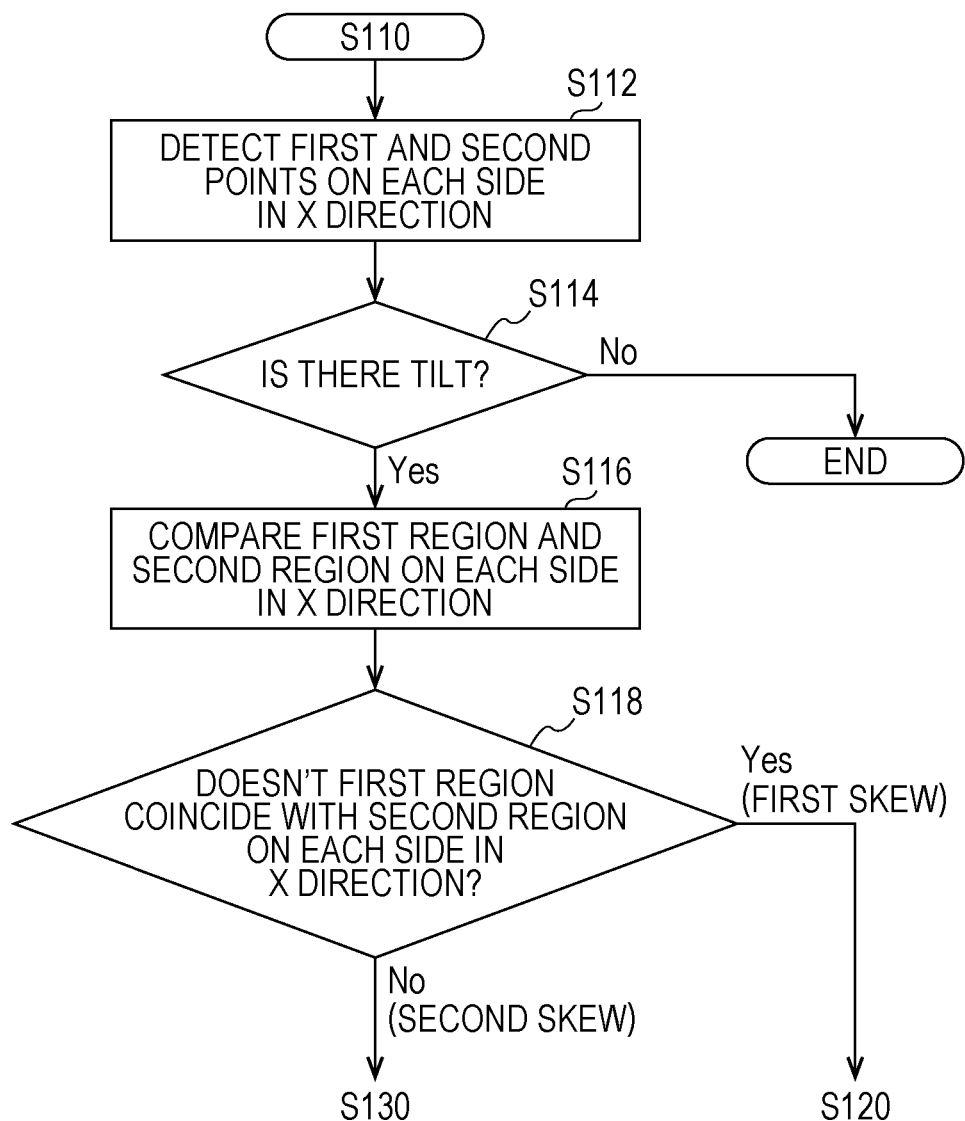
FIG. 4 is a flowchart illustrating details of a determination method in step S110.

FIG. 4 is a flowchart illustrating details of the determination method in step S110.

Figure 5:
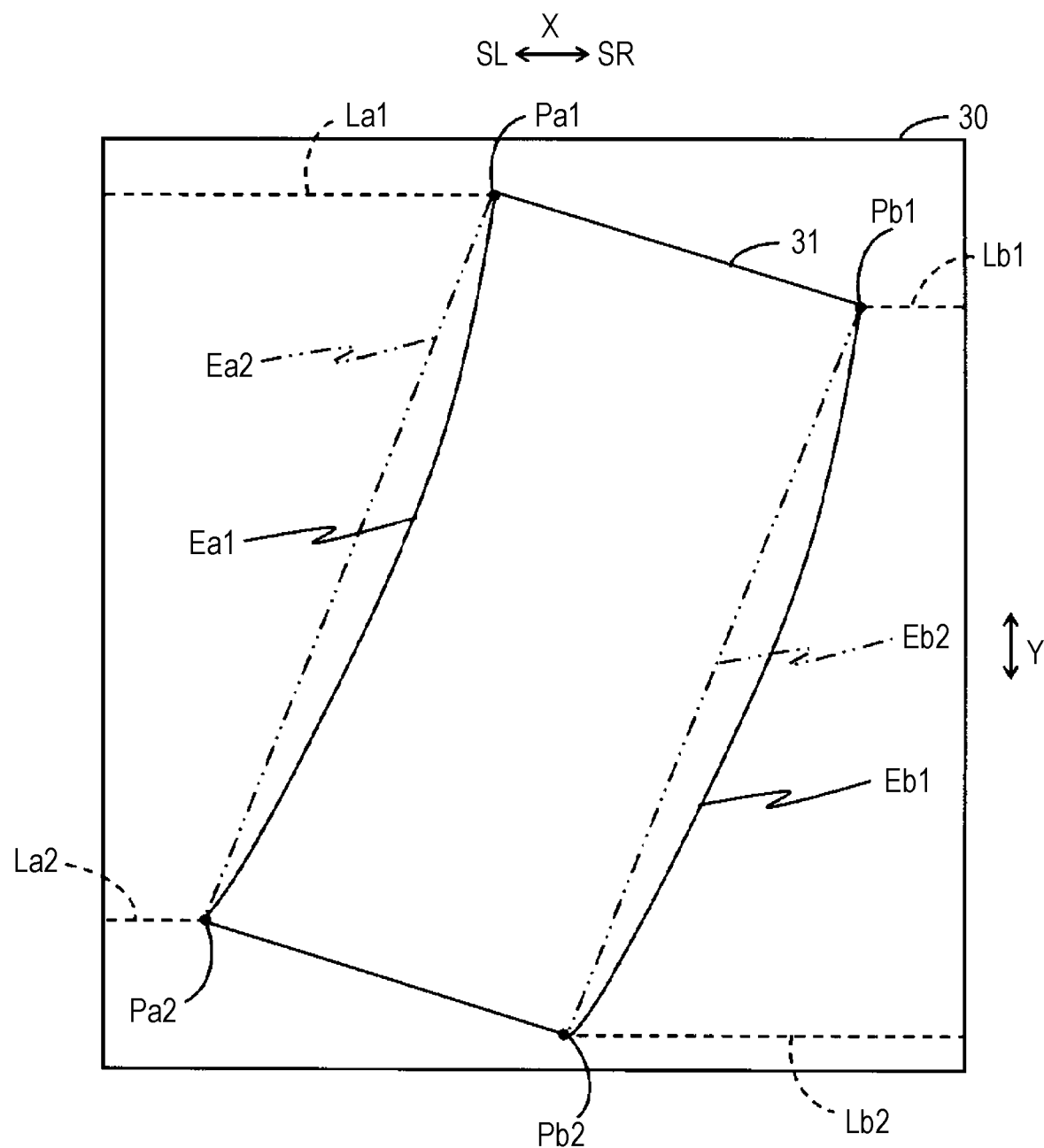
FIG. 5 is a diagram for specifically explaining the determination method in step S110.

FIG. 5 is a diagram for specifically explaining the determination method in step S110. Similarly to FIGS. 3A and 3B, FIG. 5 also illustrates the read image 30 and the original document image 31 in the read image 30. However, in FIG. 5, in order to facilitate understanding of the tilt and distortion of the original document image 31, the ratio of the original document image 31 to the read image 30 is made smaller than in FIGS. 3A and 3B, and the tilt and distortion of the original document image 31 are highlighted.

In step S112, the control section 21 detects the first point and the second point included on the edge of the original document image corresponding to one side of the original document on each side in the X direction. Specifically, the control section 21 scans the pixels from the side of the read image 30 to the center thereof for each raster line of the read image 30 and detects edge pixels corresponding to edges of the original document image 31. The raster line of the read image 30 is a region constituted by pixels aligned in the X direction. The raster line may be called a pixel row. The pixels constituting the read image 30 each have a gradation value and brightness (brightness or luminance) for each color such as red, green, and blue (RGB). The region outside the original document image 31 in the read image 30 corresponds to the reading result of the background plate of the scanner 10 at the reading position of the original document and is a color which is substantially even and darker than the color (for example, white) of the original document. Therefore, the control section 31 scans the pixels from the end of the read image 30 to the center thereof for each raster line so as to detect, as an edge pixel, each pixel, at a position where the color or the brightness first fluctuates to be equal to or greater than a predetermined threshold value (a threshold value which is set in advance to detect edge pixels), in the raster line.

The control section 21 scans the pixels for each raster line as described above from both ends of the raster line, that is, from one side and the other side in the X direction to the center of the read image 30. As a result, the control section 21 detects an edge pixel Pa1, an edge pixel Pa2, an edge pixel Pb1, and an edge pixel Pb2. On the one side (the left side SL in FIG. 5) in the X direction, the edge pixel Pa1 is on the uppermost end (the upper end in the Y direction) of the original document image 31, and the edge pixel Pa2 is on the lowermost end (the lower end in the Y direction) of the original document image 31. On the other side (the right side SR in FIG. 5) in the X direction, the edge pixel Pb1 is on the uppermost end of the original document image 31, and the edge pixel Pb2 is on the lowermost end of the original document image 31.

The edge pixel Pa1 and the edge pixel Pa2 correspond to the first point and the second point included on the edge of the original document image 31 on the side SL. The edge pixel Pb1 and the edge pixel Pb2 correspond to the first point and the second point included on the edge of the original document image 31 on the side SR. More specifically, the XY coordinate value indicating the position of the edge pixel Pa1 and the XY coordinate value indicating the position of the edge pixel Pa2 correspond to the first point and the second point included on the edge of the original document image 31 on the side SL. The XY coordinate value indicating the position of the edge pixel Pb1 and the XY coordinate value indicating the position of the edge pixel Pb2 correspond to the first point and the second point included on the edge of the original document image 31 on the side SR.

The relationship between the first point and the second point included on the edge of the original document image is not limited to the relationship between the uppermost point and the lowermost point of a common edge (one side of the original document image 31) as illustrated in FIG. 5. The first point and the second point included on the edge of the original document image may be two points included on the common edge and separated in the Y direction. However, by setting the uppermost point and the lowermost point of the common edge as the first point and the second point, it is possible to more accurately detect whether or not the edge is distorted (curved or folded).

In step S114, the control section 21 determines whether or not there is tilt of the original document image. When "No", that is, when it is determined that there is no tilt, the control section 21 ends the processing of step S110 and ends the flowchart of FIG. 2. In contrast, when "Yes", that is, when it is determined that there is tilt, the control section 21 causes the processing to proceed from step S114 to step S116. The method of determining whether or not there is tilt of the original document image is not particularly limited. For example, when a straight line connecting a pair of the first point and the second point (for example, the edge pixel Pa1 and the edge pixel Pa2) is parallel or substantially parallel to the Y direction, the control section 21 determines that there is no tilt of the original document image 31. In this case, the term "substantially parallel" denotes a state where the tilt of the original document image is small enough that it is not necessary to perform skew handling processing, which is to be described later. More specifically, when the angle formed by the Y direction and the straight line connecting the pair of the first point and the second point is within a predetermined threshold value for the angle which is set for determining whether or not there is tilt, the control section 21 determines that there is no tilt of the original document image 31. In contrast, when the angle formed by the Y direction and the straight line connecting the pair of the first point and the second point is greater than the predetermined threshold value for the angle which is set for determining whether or not there is tilt, the control section 21 determines that there is tilt of the original document image 31.

In step S116, the control section 21 compares a first region and a second region in the read image. The first region is sectioned by the straight line connecting the first point and the second point. The second region is sectioned by the edge of the original document image between the first point and the second point. The control section 21 performs the comparison in step S116 on each side in the X direction.

Referring to FIG. 5, the first region on the side SL is sectioned by a straight line Ea2, a straight line La1, a straight line La2, and the edge of the read image 30 on the side SL. The straight line Ea2 connects the edge pixel Pa1 and the edge pixel Pa2. The straight line La1 reaches the edge pixel Pa1 from the edge of the read image 30 on the side SL parallel to the X direction. The straight line La2 reaches the edge pixel Pa2 from the edge of the read image 30 on the side SL parallel to the X direction. The straight line La1 is a portion of the raster line including the edge pixel Pa1, and likewise, the straight line La2 is a portion of the raster line including the edge pixel Pa2.

The second region on the side SL is sectioned by the edge of the original document image 31 connecting the edge pixel Pa1 and the edge pixel Pa2, the straight line La1, the straight line La2, and the edge of the read image 30 on the side SL. The edge of the original document image 31 connecting the edge pixel Pa1 and the edge pixel Pa2 may be straight, as with the straight line Ea2 indicated by the chain double-dashed line in FIG. 5, or may be distorted, as with a curve Ea1 indicated by the solid line in FIG. 5. In any case, in the processing of step S112, the control section 21 has already detected edge pixels of the original document image 31 for each raster line and on each of the side SL and the side SR. Therefore, the control section 21 detects a line, which connects positions of a plurality of edge pixels on the side SL between the edge pixel Pa1 and the edge pixel Pa2, as the edge of the original document image 31 connecting the edge pixel Pa1 and the edge pixel Pa2.

The control section 21 compares the area of the first region on the side SL with the area of the second region on the side SL and determines whether or not the regions coincide. The control section 21 may set the number of pixels in a region as the area of the region. When the areas of the first region and the second region on the side SL coincide, it is presumed that the edge of the original document image 31 on the side SL is straight, that is, not distorted.

Similarly, the control section 21 compares the first region of the side SR with the second region of the side SR and determines whether or not the regions coincide. The first region on the side SR is sectioned by a straight line Eb2, a straight line Lb1, a straight line Lb2, and the edge of the read image 30 on the side SR. The straight line Eb2 connects the edge pixel Pb1 and the edge pixel Pb2. The straight line Lb1 reaches the edge pixel Pb1 from the edge of the read image 30 on the side SR parallel to the X direction. The straight line Lb2 reaches the edge pixel Pb2 from the edge of the read image 30 on the side SR parallel to the X direction. The straight line Lb1 is a part of the raster line including the edge pixel Pb1, and likewise, the straight line Lb2 is a part of the raster line including the edge pixel Pb2.

The second region on the side SR is sectioned by the edge of the original document image 31 connecting the edge pixel Pb1 and the edge pixel Pb2, the straight line Lb1, the straight line Lb2, and the edge of the read image 30 on the side SR. The edge of the original document image 31 connecting the edge pixel Pb1 and the edge pixel Pb2 may be straight as the straight line Eb2 indicated by the chain double-dashed line in FIG. 5 or may be distorted as a curve Eb1 indicated by the solid line. The control section 21 detects a line, which connects positions of a plurality of edge pixels on the side SR between the edge pixel Pb1 and the edge pixel Pb2, as the edge of the original document image 31 connecting the edge pixel Pb1 and the edge pixel Pb2. When the areas of the first region and the second region on the side SR coincide, it is presumed that the edge of the original document image 31 on the other side SR is straight, that is, not distorted.

Figure 6:
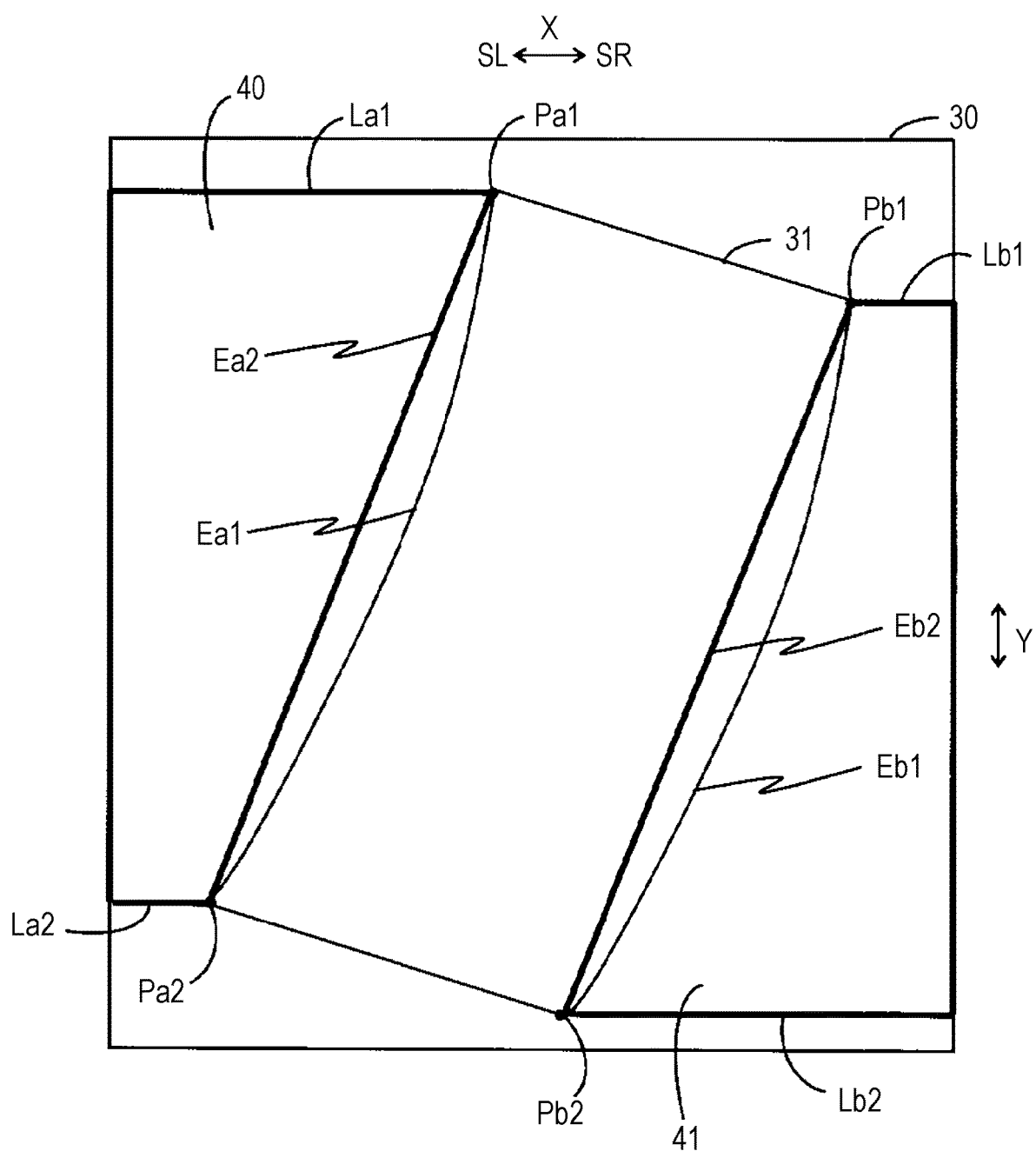
FIG. 6 is a diagram highlighting a first region on one side and a first region on the other side in the contents illustrated in FIG. 5.
Figure 7:
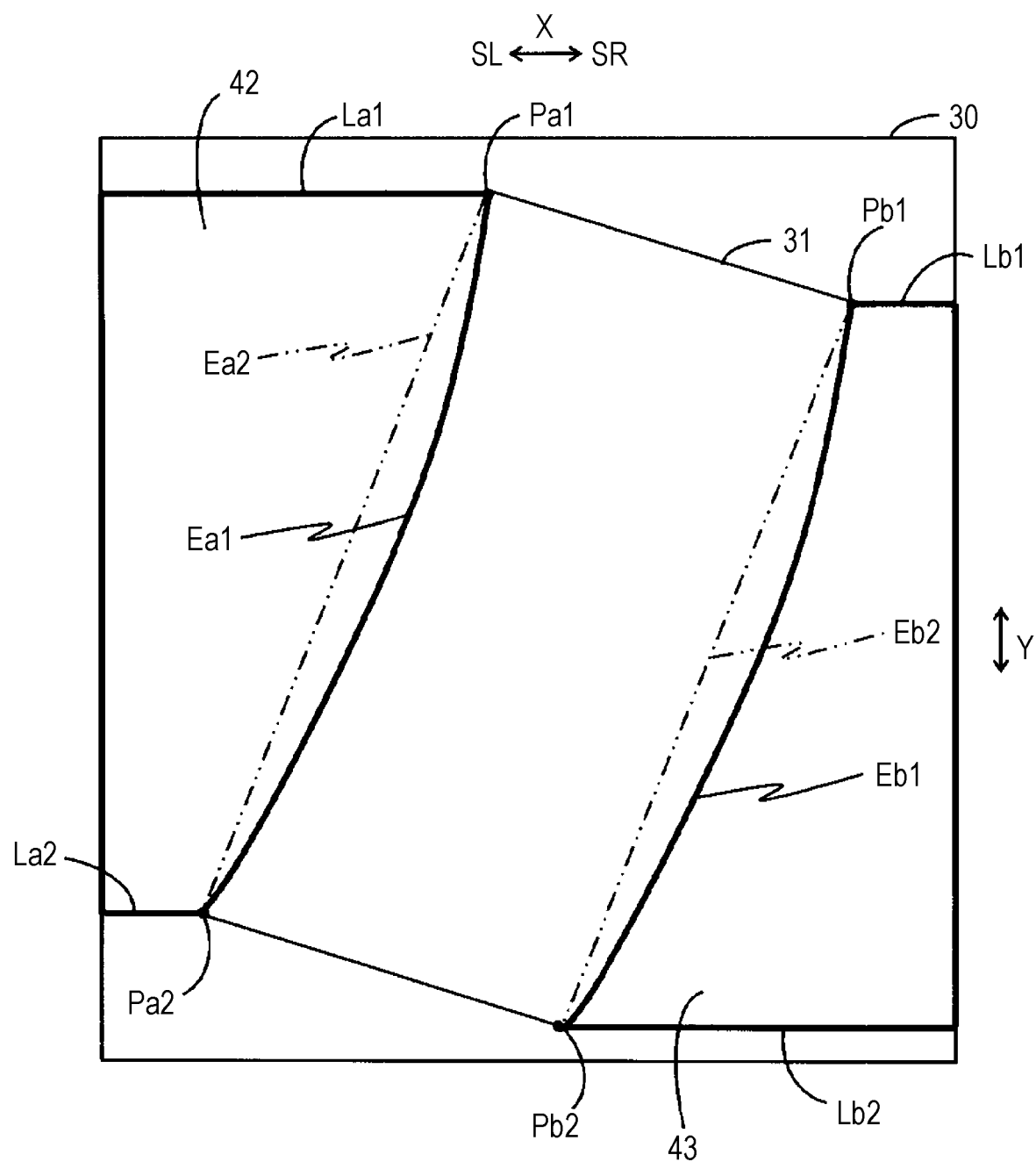
FIG. 7 is a diagram highlighting a second region on one side and a second region on the other side in the contents illustrated in FIG. 5.

FIGS. 6 and 7 illustrate the same read image 30 as in FIG. 5. In FIG. 6, in order to facilitate understanding, the first region (40) on the side SL and the first region (41) on the side SR are surrounded by bold lines. In FIG. 7, in order to facilitate understanding, the second region (42) on the side SL and the second region (43) on the side SR are surrounded by bold lines.

In the comparison of the areas of the first region and the second region, the control section 21 may determine that the areas of the first region and the second region coincide not only when the areas coincide but also when the difference between the compared regions is a small difference within a predetermined degree. For example, when the difference between the area of the second region and the area of the first region or the ratio thereof is within a predetermined threshold value for the difference or the ratio, the control section 21 determines that the areas of the first region and the second region coincide.

In step S118, the control section 21 advances the processing to one of different steps in accordance with the comparison result in step S116. When the areas of the first region and the second region do not coincide on each side in the X direction, the control section 21 determines that the skew of the original document image is the second skew, and the processing proceeds to step S130. That is, when the areas of the first region and the second region do not coincide on each side in the X direction, the tilt of the original document image is highly likely to occur with distortion, and the processing proceeds to step S130.

When the area of the first region and the area of the second region coincide on at least one of both sides (the side SL and the side SR) in the X direction, the control section 21 determines that the skew of the original document image is the first skew, and the processing proceeds to step S120. When the areas of the first region and the second region coincide on each side in the X direction, the tilt of the original document image is a simple tilt without distortion, and the processing proceeds to step S120. Here, a notch may be formed in a part of the edge of the original document, or the color of the original document may be the same as or similar to the color (for example, black) of the above-mentioned background plate in a range in which the background plate is in contact with a part of the edge of the original document. In this case, although the original document at the time of reading is not distorted, in steps S112 and S116, a part of the edge of the original document image may be detected as a curve or a polygonal line. That is, when the areas of the first region and the second region do not coincide on either one of the both sides in the X direction, the tilt of the original document image is likely to occur without distortion. In consideration of such circumstances, in step S118, when the areas of the first region and the second region do not coincide on either one of the both sides in the X direction, the control section 21 determines that the skew of the original document image is the first skew.

Returning to FIG. 2, the description will be continued.

In step S120, the control section 21 executes skew correction processing of correcting the tilt of the original document image. The skew correction processing may be any image processing as long as the processing is able to correct the tilt of the original document image in the read image, and thus details are omitted. For example, the control section 21 rotates the original document image 31 such that the tilt of the original document image 31 with respect to the Y direction becomes 0°. The control section 21 executes step S120 and then ends the flowchart of FIG. 2.

In step S130, the control section 21 executes guidance processing of providing guidance for the reading of the original document again. In this case, the control section 21 causes the display section 26 to display a message (rescan message) for prompting the user to cause the original document to be read again. The control section 21 may cause the rescan message to be output as sound from a speaker which is not illustrated.

Figure 8:
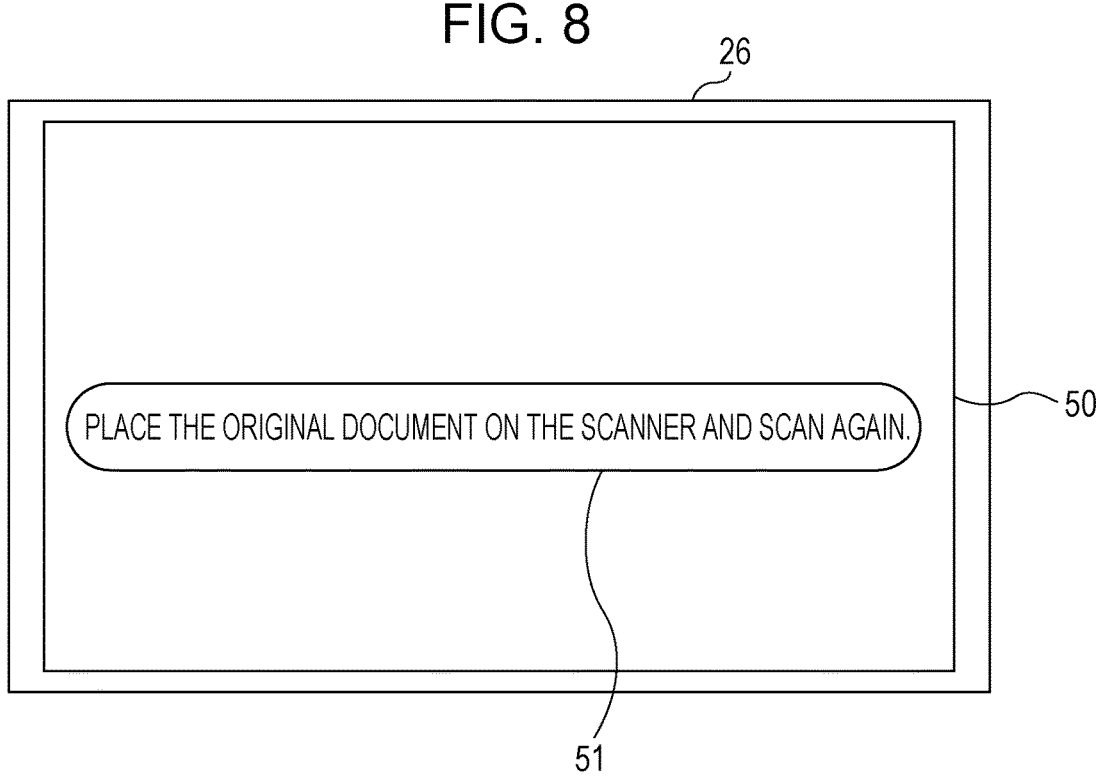
FIG. 8 is a diagram illustrating an example of a guide screen.

FIG. 8 illustrates an example of a guide screen 50 displayed by the control section 21 on the display section 26 in step S130. The guide screen 50 includes a rescan message 51. As a specific example of the rescan message 51, the content such as an expression "place the original document on the scanner and scan again" is considered. In addition, the control section 21 may inform a user of the rescan image including: a situation where tilt with distortion occurs in the original document in the process of transport of the original document performed by the scanner 10; and a method of correctly placing the original document on the scanner 10. The control section 21 executes step S130 and then ends the flowchart of FIG. 2. When executing step S130 and ending the flowchart of FIG. 2, the control section 21 may erase the data of the read image acquired in step S100.

Steps S120 and S130 each correspond to one processing (skew handling processing) executed by the image processing device 20 when the skew of the original document image occurs. The flow of executing step S120 or S130 after step S110 corresponds to a processing step of changing the skew handling processing in accordance with the determination result of step S110. Further, from the viewpoint of realizing such a processing step, the control section 21 running the program 22 functions as the processing section 25 that changes the skew handling processing in accordance with the result of the determination.

Needless to say, each step illustrated in FIG. 2 is a part of the processing executed by the image processing device 20. For example, it may be determined in step S110 that there is no tilt and the flowchart in FIG. 2 may be completed, or the flowchart in FIG. 2 may be completed through step S120. In such a case, the image processing device 20 may cause the storage section 28 to store the read image acquired in step S100 or the read image subjected to the skew correction processing in step S120, may further perform another image processing on the read image, may transfer the read image to an external transfer destination set by a user, or may print the read image.

The above-mentioned embodiment is also referred to as a first embodiment. Hereinafter, the second embodiment and the third embodiment different from the first embodiment will be described. In the second embodiment and the third embodiment, points different from the first embodiment will be described.

3. Second Embodiment

Figure 9:
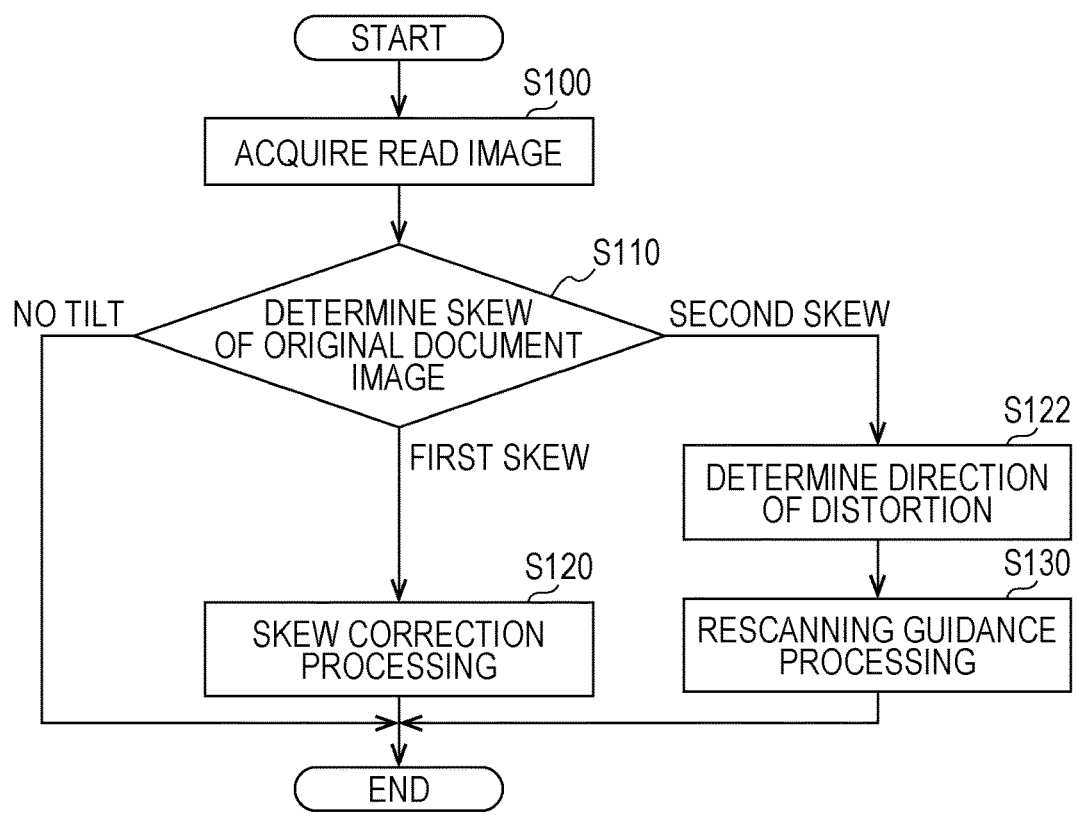
FIG. 9 is a flowchart illustrating processing according to a second embodiment.

FIG. 9 is a flowchart illustrating the processing executed by the control section 21 of the image processing device 20 in accordance with the program 22 according to the second embodiment.

In the second embodiment, after the control section 21 determines that the skew of the original document image is the second skew in step S110, the processing proceeds to step S122.

In step S122, the control section 21 functioning as the determination section 24 determines the direction of distortion of the original document image in the second skew of the original document image. The fact that the second skew occurs in the original document image denotes that the areas of the first region and the second region do not coincide on each side in the X direction, as described above. Therefore, the control section 21 determines the direction of the distortion of the original document image based on the magnitude relation between the first region and the second region on each of the side SL and the side SR.

A description will be given with reference to FIGS. 5 to 7. As described above, the first region 40 on the side SL is sectioned by the straight line Ea2 connecting the edge pixel Pa1 and the edge pixel Pa2, the straight line La1, the straight line La2, and the edge of the read image 30 on the side SL. The second region 42 on the side SL is sectioned by the edge of the original document image 31 connecting the edge pixel Pa1 and the edge pixel Pa2, the straight line La1, the straight line La2, and the edge of the read image 30 on the side SL. The first region 41 on the side SR is sectioned by the straight line Eb2 connecting the edge pixel Pb1 and the edge pixel Pb2, the straight line Lb1, the straight line Lb2, and the edge of the read image 30 on the side SR. The second region 43 on the side SR is sectioned by the edge of the original document image 31 connecting the edge pixel Pb1 and the edge pixel Pb2, the straight line Lb1, the straight line Lb2, and the edge of the read image 30 on the side SR.

Then, the control section 21 determines that the original document image is distorted toward the side SL when the area of the first region 40 on the side SL<the area of the second region 42 on the side SL and the area of the first region 41 on the side SR>the area of the second region 43 on the side SR. In contrast, the control section 21 determines that the original document image is distorted toward the side SR when the area of the first region 40 on the side SL>the area of the second region 42 on the side SL and the area of the first region 41 on the side SR<the area of the second region 43 on the side SR.

In step S130 after step S122, the control section 21 functioning as the processing section 25 changes the content of the rescan message in accordance with the direction of distortion determined in step S122. For convenience of description, at the user's point of view when using the scanner 10, it is assumed that the left side of the original document setting position in the original document tray or the like of the scanner 10 corresponds to the side SL in the X direction, and the right side of the original document setting position corresponds to the side SR in the X direction. Under such an assumption, when it is determined in step S122 that the original document image is distorted toward the side SL, in step S130, the control section 21 informs the user of the rescan message including a method of correctly placing the original document on the scanner 10. For example, the method may be as follows. "Place the original document against the left side of the original document setting position." Further, when it is determined in step S122 that the original document image is distorted toward the side SR, in step S130, the control section 21 informs the user of the rescan message including a method of correctly placing the original document on the scanner 10. For example, the method may be as follows. "Place the original document against the right side of the original document setting position."

It is apparent that the content of the rescan message is not limited to the above example. However, in the second embodiment, by changing the content of the rescan message in accordance with the direction of distortion of the original document image determined in step S122, it is possible to obtain an appropriate reading result without tilt or distortion, and it is possible to inform the user of the easy scanning method.

4. Third Embodiment

Figure 10:
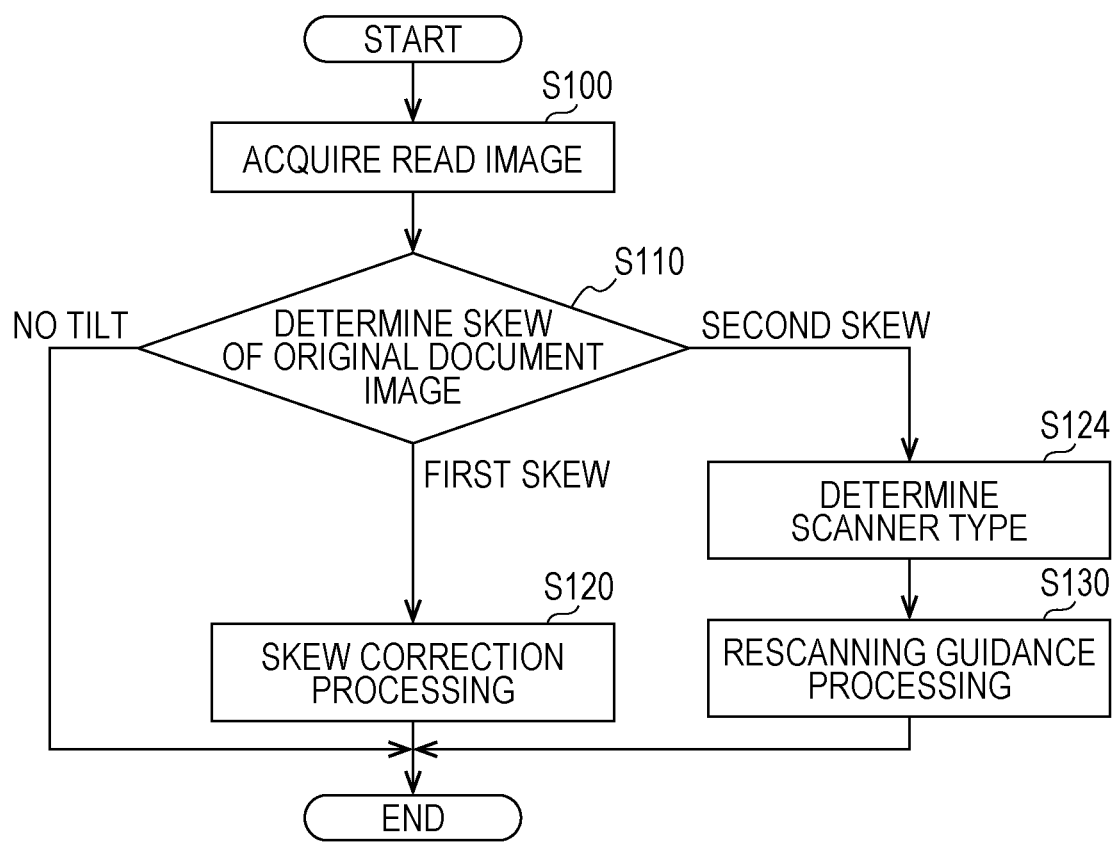
FIG. 10 is a flowchart illustrating processing according to a third embodiment.

FIG. 10 is a flowchart illustrating the processing executed by the control section 21 of the image processing device 20 in accordance with the program 22 according to the third embodiment.

In the third embodiment, after the control section 21 determines that the skew of the original document image is the second skew in step S110, the processing proceeds to step S124.

In step S124, the control section 21 determines the type of the scanner 10 as a generation source of the read image. The control section 21 is able to determine the type of the scanner 10 by referring to the model information that defines various specifications relating to the scanner 10. The model information of the scanner 10 is held by the scanner 10. The control section 21 may acquire the model information from the scanner 10 by communicating with the scanner 10 at the timing of step S124 or may refer to the model information, which is acquired from the scanner 10 before step S124, in step S124.

The control section 21 determines whether or not the type of the scanner 10 as the generation source of the read image corresponds to a model having a paper guide based on the model information. The paper guide is a known member that is configured to come into contact with an edge of the original document on the right or left side of the original document at the original document setting position such as the original document tray in order to minimize the tilt of the original document with respect to the transport direction. In many cases, the paper guide is provided with right and left wall members movable along the left and right directions orthogonal to the transport direction. Thus, a user adjusts the distance between the left and right wall members in accordance with the size of the original document, thereby regulating the position of the original document by the left and right wall members.

In step S130 after step S124, the control section 21 functioning as the processing section 25 changes the content of the rescan message in accordance with the type of the scanner 10 determined in step S124. When the control section 21 determines in step S124 that the type of the scanner 10 corresponds to a model having a paper guide, in step S130, the control section 21 informs the user of the rescan message including a method of correctly placing the original document on the scanner 10. For example, the method may be as follows. "Place the original document against the paper guide of the scanner." Further, when the control section 21 determines in step S124 that the type of the scanner 10 corresponds to a model having no paper guide, in step S130, the control section 21 informs the user of the rescan message including a method of correctly placing the original document on the scanner 10. For example, the method may be as follows. "Align the original document at the center of the original document setting position." It is apparent that the content of the rescan message is not limited to the above example. However, in the third embodiment, by changing the content of the rescan message in accordance with the type of the scanner 10 determined in step S124, it is possible to inform the user of a scanning method by which an appropriate reading result without tilt or distortion may be easily obtained.

An embodiment, in which the second embodiment and the third embodiment are combined, is also considered. That is, after the control section 21 determines the skew of the original document image as the second skew in step S110, the processing may proceed to step S130 after the determination in step S122 (FIG. 9) and the determination in step S124 (FIG. 10). In step S130, the control section 21 changes the content of the rescan message in accordance with the direction of distortion determined in step S122 and the type of scanner 10 determined in step S124. For example, when the type of the scanner 10 corresponds to a model having a paper guide, the control section 21 inform the user of the rescan message including a message such as an expression "place the original document against the paper guide of the scanner" in step S130. In contrast, when the type of the scanner 10 corresponds to a model having no paper guide, the control section 21 inform the user of the rescan message including a message such as an expression "place the original document against the left side of the original document setting position" or "place the original document against the right side of the original document setting position" in step S130 based on the direction of the distortion of the original document image.

5. Conclusion

As described above, according to the present embodiment, the image processing device 20 includes the acquisition section 23, the determination section 24, and the processing section 25. The acquisition section 23 acquires the read image generated by reading the original document. The determination section 24 determines which one of the first skew and the second skew occurs in accordance with an original document image corresponding to the original document in the read image. The first skew causes tilt in the original document image. The second skew causes distortion in the original document image. The processing section 25 changes the skew handling processing in accordance with the result of the determination.

According to the above configuration, it is possible to select and execute an appropriate skew handling processing in accordance with the type of skew of the original document image. As a result, it is possible to obtain a higher quality result of reading performed on the original document. The acquisition section 23 acquires the read image generated by the scanner 10 that reads the original document while the transport mechanism 12 transports the original document. That is, the image processing device 20 selects and executes an appropriate skew handling processing in accordance with the skew of the original document caused by the transport of the original document in the scanner 10.

Further, according to the present embodiment, the second skew has distortion of the original document image and tilt of the original document image.

According to the above configuration, it is possible to automatically determine whether the tilt of the original document image is tilt without distortion (first skew) or tilt with distortion (second skew). Then, the skew handling processing is changeable between the case where the first skew occurs and the case where the second skew occurs. That is, it is possible to execute a skew handling processing appropriate for each of the case where tilt without distortion in the original document image occurs in the read image and the case where tilt with distortion in the original document image occurs.

According to the present embodiment, the determination section 24 determines which one of the first skew and the second skew corresponds to the tilt of the original document image in accordance with the comparison between the area of the first region and the area of the second region. The first region in the read image is sectioned by the straight line connecting the first point and the second point included on the edge of the original document image corresponding to one side of the original document. The second region in the read image is sectioned by the edge of the original document image between the first point and the second point.

According to the above configuration, it is possible to accurately determine whether the skew of the original document image corresponds to the second skew causing distortion.

According to the present embodiment, when it is determined that the first skew occurs in the original document image, the processing section 25 executes skew correction processing of correcting the tilt of the original document image (step S120). When it is determined that the second skew occurs in the original document image, the processing section 25 executes guidance processing of providing guidance for reading the original document again (step S130).

That is, when the tilt of the original document image corresponds to the second skew causing distortion, the user is prompted to cause the original document to be read again and correctly rescan the original document instead of dealing with the tilt through the skew correction processing. As a result, the possibility of obtaining a more appropriate reading result increases.

According to the present embodiment, the determination section 24 determines the direction of the distortion with respect to the original document image in which it is determined that the second skew occurs, and the processing section 25 changes the content of the guidance in accordance with the determined direction of the distortion (refer to FIG. 9).

According to the above configuration, by appropriately changing the content of the rescan message in accordance with the direction of the distortion of the original document image, it is possible for the user to execute appropriate rescanning that does not cause tilt and distortion of the original document image.

According to the present embodiment, the processing section 25 changes the content of the guidance in accordance with the type of the scanner 10 that generates the read image by reading the original document (refer to FIG. 10).

According to the above configuration, by appropriately changing the content of the rescan message in accordance with the type of the scanner 10, it is possible for the user to execute appropriate rescanning that does not cause tilt and distortion of the original document image.

The present embodiment is not limited to the above description, but includes various aspects as described below.

In the above-mentioned description, the tilt without distortion of the original document image is defined as the first skew, and the tilt with distortion of the original document image is defined as the second skew. However, each meaning of the first skew and the second skew may be different from that in the above description. For example, in step S110, the control section 21 may determine that either the tilt without distortion of the original document image or the tilt with distortion of the original document image corresponds to the first skew, and the processing may proceed to step S120. In addition, the control section 21 may determine that the tilt with the distortion of the original document image greater than the distortion of the first skew corresponds to the second skew, and the processing may proceed to step S130. That is, when the degree of distortion is less than a certain reference, step S120 is selected as the skew handling processing, and when the degree of distortion is greater than the reference, step S130 is selected as the skew handling processing. For example, the control section 21 determines that the degree of distortion is large (second skew) when the area of the first region and the area of the second region do not coincide on each of the side SL and the side SR and the difference between the areas of the first region and the second region is equal to or greater than a predetermined threshold value for the difference. Further, the control section 21 determines that the degree of distortion is small (first skew) when the area of the first region and the area of the second region do not coincide on at least one of the side SL and the side SR and the difference between the areas of the first region and the second region on at least one of the side SL and the side SR is less than a predetermined threshold value for the difference.

The skew handling processing executed in steps S120 and S130 is not limited to that in the above description. For example, in step S130, the control section 21 may execute image processing of correcting image distortion caused by change in tilt of the original document disclosed in the above-mentioned JP-A-2016-123043, instead of the rescanning guidance processing.

In the above-mentioned description, when the areas of the first region and the second region do not coincide on each side in the X direction in step S118 of FIG. 4, the control section 21 determines that the tilt of the original document image occurs with distortion. However, as another aspect, in step S118, when the areas of the first region and the second region do not coincide on at least one of both sides (the side SL and the side SR) in the X direction, the control section 21 determines that the tilt of the original document image occurs with distortion. In addition, when the areas of the first region and the second region coincide on each side in the X direction, the control section 21 determines that the tilt of the original document image occurs without distortion.

The method of determining whether or not there is distortion at the edge of the original document image is not limited to the method of comparing the areas of the first region and the second region as described above. For example, the control section 21 determines whether or not the straight line connecting the first point and the second point included on the edge of the original document image coincides with the edge of the original document image between the first point and the second point. That is, when the straight line connecting the first point and the second point included on the edge of the original document image coincides with the edge of the original document image between the first point and the second point, it can be determined that there is no distortion at the edge of the original document image. In addition, when the straight line does not coincide with the edge, it can be determined that there is distortion at the edge of the original document image. Further, the control section 21 is able to more easily determine that there is no distortion when the edge of the original document image between the first point and the second point is a straight line and is able to determine that there is a distortion at the edge when the edge of the original document image is a curve or a polygonal line.

What is claimed is:

1. An image processing device comprising:
a communication interface configured to acquire a read image generated by a sheet-feed-type scanner configured to read an original document while the original document is being transported; and a processor configured to determine, in accordance with an original document image which corresponds to the original document in the read image, which one of a first skew having tilt in the original document image and a second skew having distortion caused by the sheet-feed-type scanner transporting the original document occurs in the original document image, and configured to change in accordance with a result of the determination, processing to be executed when the first skew or the second skew occurs in the original document image, wherein the processor is configured to perform the determination by comparing an area of a first region in the read image and an area of a second region in the read image, wherein the first region in the read image is sectioned by a straight line connecting a first point and a second point included on an edge of the original document image corresponding to one side of the original document, and the second region in the read image is sectioned by the edge of the original document image between the first point and the second point.

2. The image processing device according to claim 1, wherein the second skew includes the distortion of the original document image and the tilt of the original document image.

3. The image processing device according to claim 1, wherein the processor is configured to execute skew correction processing of correcting the tilt of the original document image when it is determined that the first skew occurs in the original document image, and to execute guidance processing of guiding a user to cause the original document to be read again when it is determined that the second skew occurs in the original document image.

4. The image processing device according to claim 3, wherein the processor is configured to determine a direction of the distortion with respect to the original document image in which it is determined that the second skew occurs, and to change guidance content in accordance with the determined direction of the distortion.

5. The image processing device according to claim 3, wherein the processor changes guidance content in accordance with a type of a scanner which generates the read image by reading the original document.

6. The image processing device according to claim 1, wherein the communication interface is configured to acquire the read image generated by the sheet-feed-type scanner while transporting the original document by a transport mechanism.

7. The image processing device according to claim 1, wherein the distortion of the second skew is caused by the original document being transported by the sheet-feed-type scanner.

8. An image processing method comprising:

acquiring a read image generated by reading an original document using a sheet-feed-type scanner configured to read the original document while the original document is being transported; and determining, in accordance with an original document image which corresponds to the original document in the read image, which one of a first skew having tilt in the original document image and a second skew having distortion caused by the sheet-feed-type scanner transporting the original document occurs in the original document image; and changing, in accordance with a result of the determination, processing to be executed when the first skew or the second skew occurs in the original document image, wherein the determination is performed by comparing an area of a first region in the read image and an area of a second region in the read image, the first region in the read image is sectioned by a straight line connecting a first point and a second point included on an edge of the original document image corresponding to one side of the original document, and the second region in the read image is sectioned by the edge of the original document image between the first point and the second point.

9. A non-transitory computer-readable storage medium storing image processing instructions that when executed by a processor cause the processor to:

acquire a read image generated by reading an original document using a sheet-feed-type scanner transporting the original document configured to read the original document while the original document is being transported, and determining, in accordance with an original document image which corresponds to the original document in the read image, which one of a first skew having tilt in the original document image and a second skew having distortion caused by the sheet-feed-type scanner occurs in the original document image; and change, in accordance with a result of the determination, processing to be executed when the first skew or the second skew occurs in the original document image, wherein the determination is performed by comparing an area of a first region in the read image and an area of a second region in the read image, the first region in the read image is sectioned by a straight line connecting a first point and a second point included on an edge of the original document image corresponding to one side of the original document, and the second region in the read image is sectioned by the edge of the original document image between the first point and the second point.

* * * * *